US012000569B1

(12) United States Patent
Chen

(10) Patent No.: US 12,000,569 B1
(45) Date of Patent: Jun. 4, 2024

(54) LED LIGHT SUPPORTING SYSTEM FOR CHANNEL LETTERS

(71) Applicant: Sikai Chen, Delran, NJ (US)

(72) Inventor: Sikai Chen, Delran, NJ (US)

( * ) Notice: Subject to any disclaimer, the term of this patent is extended or adjusted under 35 U.S.C. 154(b) by 0 days.

(21) Appl. No.: 18/465,475

(22) Filed: Sep. 12, 2023

(51) Int. Cl.
*F21V 19/00* (2006.01)
*F21Y 105/12* (2016.01)
*F21Y 115/10* (2016.01)

(52) U.S. Cl.
CPC ......... *F21V 19/004* (2013.01); *F21Y 2105/12* (2016.08); *F21Y 2115/10* (2016.08)

(58) Field of Classification Search
CPC . F21V 19/004; F21Y 2105/12; F21Y 2115/10
See application file for complete search history.

(56) References Cited

U.S. PATENT DOCUMENTS 6,394,626 B1 * 5/2002 McColloch ............... G09F 9/33 362/648
7,931,386 B2 * 4/2011 Nall .......................... G09F 9/33 362/249.02
7,946,731 B1 * 5/2011 Wray ...................... G09F 13/22 362/249.02
8,845,131 B2 * 9/2014 Ferrie ................. G09F 13/0409 362/249.02
9,170,000 B2 * 10/2015 Quaal ..................... F21V 29/70
2002/0104241 A1 * 8/2002 Grate ...................... G09F 13/04 40/574
2003/0063463 A1 * 4/2003 Sloan ...................... F21V 29/76 362/249.06
2005/0231943 A1 * 10/2005 Sloan ...................... G09F 13/22 362/225
2006/0035511 A1 * 2/2006 Mrakovich ........... F21V 29/713 439/404
2010/0061025 A1 * 3/2010 Parker ..................... G09F 13/22 362/249.02
2014/0268786 A1 * 9/2014 Quaal ..................... G09F 13/04 362/249.08
2017/0328544 A1 * 11/2017 Gergely .................... F21S 4/28

FOREIGN PATENT DOCUMENTS

KR 101867372 B1 * 7/2018

OTHER PUBLICATIONS

English translation of Ahn KR-101867372-B1, published Jul. 2018 (Year: 2018).*

* cited by examiner

*Primary Examiner* — Evan P Dzierzynski
(74) *Attorney, Agent, or Firm* — Stuart M. Goldstein

(57) ABSTRACT

An LED light supporting system for channel letters having a signage cabinet with outer walls which surround and define the shape of the channel letter, a backboard enclosing the rear of the channel letter, and a plurality of LED light support members extending up from the backboard, within the channel letter, for mounting and supporting LED lights on the backboard. The LED light support members are located on the backboard in an arrangement which maintains and supports the plurality of LED lights in a designated alignment to properly align and position the LED lights within the channel letter.

6 Claims, 3 Drawing Sheets

LED LIGHT SUPPORTING SYSTEM FOR CHANNEL LETTERS

FIELD OF THE INVENTION

The present invention relates generally to 3D printed channel letters and specifically to the use of LED lights mounted within channel letters.

BACKGROUND OF THE INVENTION

Channel letters are routinely utilized with LED modules, LED light tape, or other lighting sources in order to illuminate various types of signage. Common practice is to attach LED lights to the backboards of channel letters by separate, independent means, e.g. by adhesives, connective devices, soldering, etc. This requires the physical placement and, critically, alignment of the LED lights manually installed on the backboards. This process is not only unduly labor intensive, but also may result in LED lighting alignment issues.

SUMMARY OF THE INVENTION

It is thus the object of the present invention to provide a system for supporting and also for attaching LED lights within channel letters which addresses and overcomes the limitations and disadvantages of existing LED light placement and supporting means.

These and other objects are accomplished by the present invention, an LED light supporting system for channel letters in which the channel letter comprises a signage cabinet with outer walls which surround and define the shape of the channel letter, a backboard enclosing the rear of the channel letter, and a plurality of LED light support members extending up from the backboard, within the channel letter, for mounting and supporting LED lights on the backboard. The LED light support members are located on the backboard in an arrangement which maintains and supports the plurality of LED lights in a designated alignment to properly align and position the LED lights within the channel letter.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
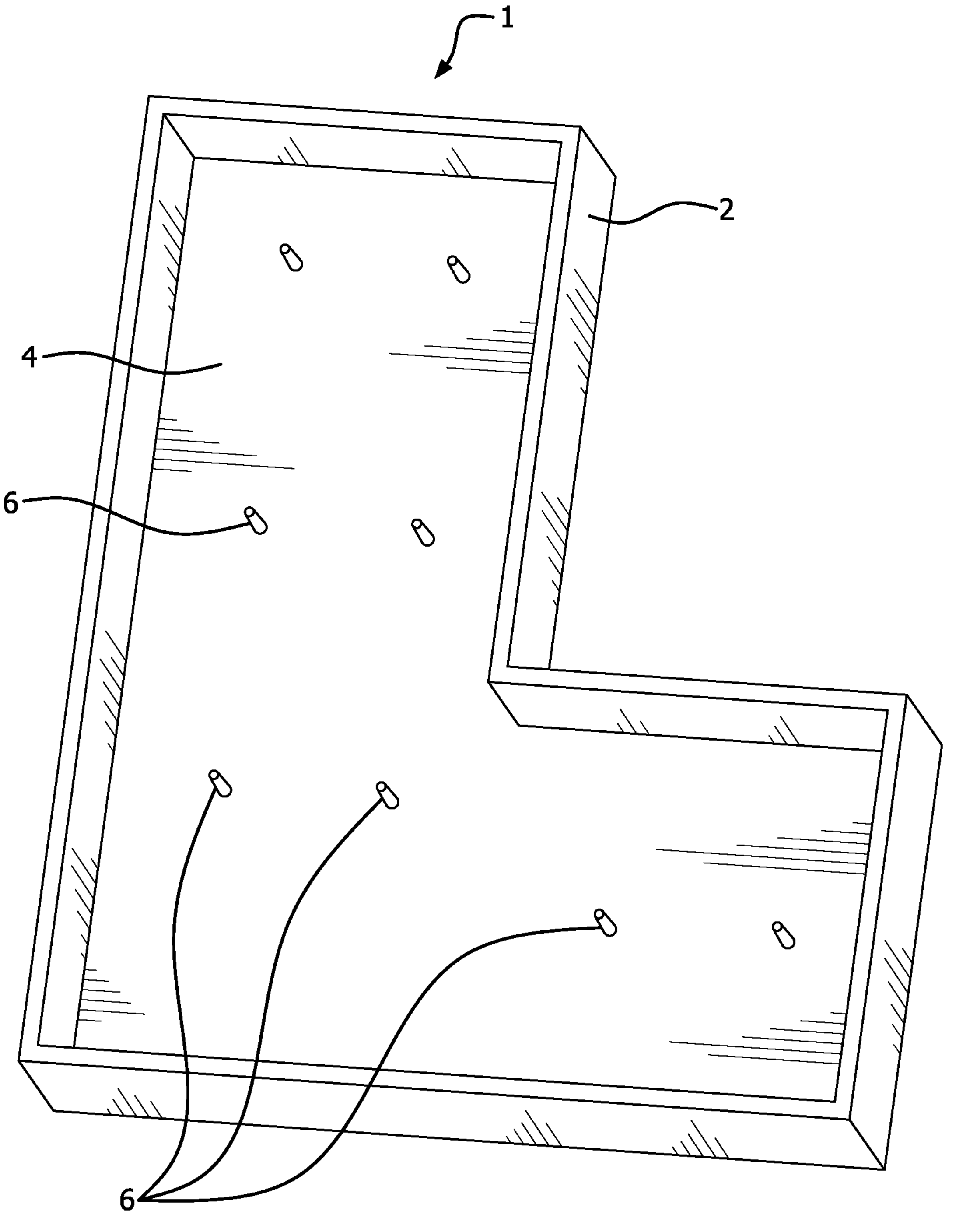
FIG. 1 is a perspective view of the present invention with support members, i.e. support pins, extending up from the backboard of a channel letter.
Figure 2:
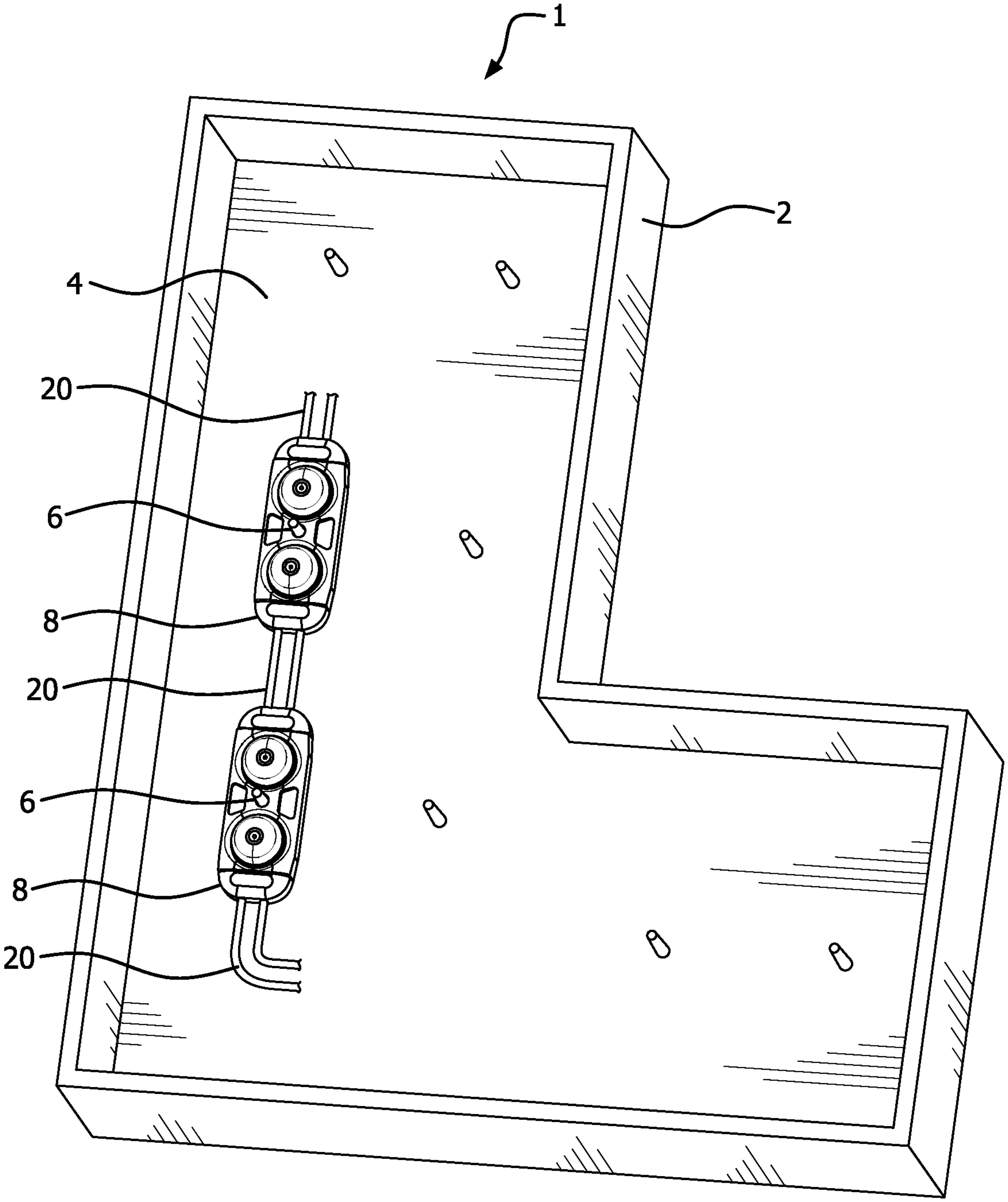
FIG. 2 is a perspective view of the present invention, with support members, i.e. support pins, extending upward from the backboard of and within a channel letter, with an exemplar LED lights, LED modules, mounted and attached to the backboard of the channel letter.

FIGS. 1 and 2 show a typical channel letter 1 comprising a signage cabinet having outer border walls 2 which define the shape of the channel letter; for instance, in FIG. 1, the letter "L." Channel letter 1 has backboard 4, also formed in the shape of the channel letter. It should be understood that the present invention can be utilized with "channel letters" representing of any letter, number or design shape.

As per the present invention, support members in the form of support pegs 6 extend up from backboard 4. Support pegs 6 are positioned in the exact alignment on backboard 4 for the intended placement and maintenance of LED lights, in this case, LED modules 8. That is, support pegs 6 are arranged in the designated alignment to properly position LED modules within the channel letter when LED modules 8 are placed over and attached to the support pegs. As seen in FIG. 2, exemplar LED modules 8 are located on backboard 4, with a support peg 6 extending through a hole opening 9 (shown in FIG. 3) through each module. In this manner, LED modules 8 and other modules to be used in channel letter 1 are easily and properly arranged and maintained on and attached to backboard 4 of the channel letter. Appropriate electrical wiring 20 extending from LED module 8 interconnects the modules and the other modules used in channel letter 1.

Figure 3:
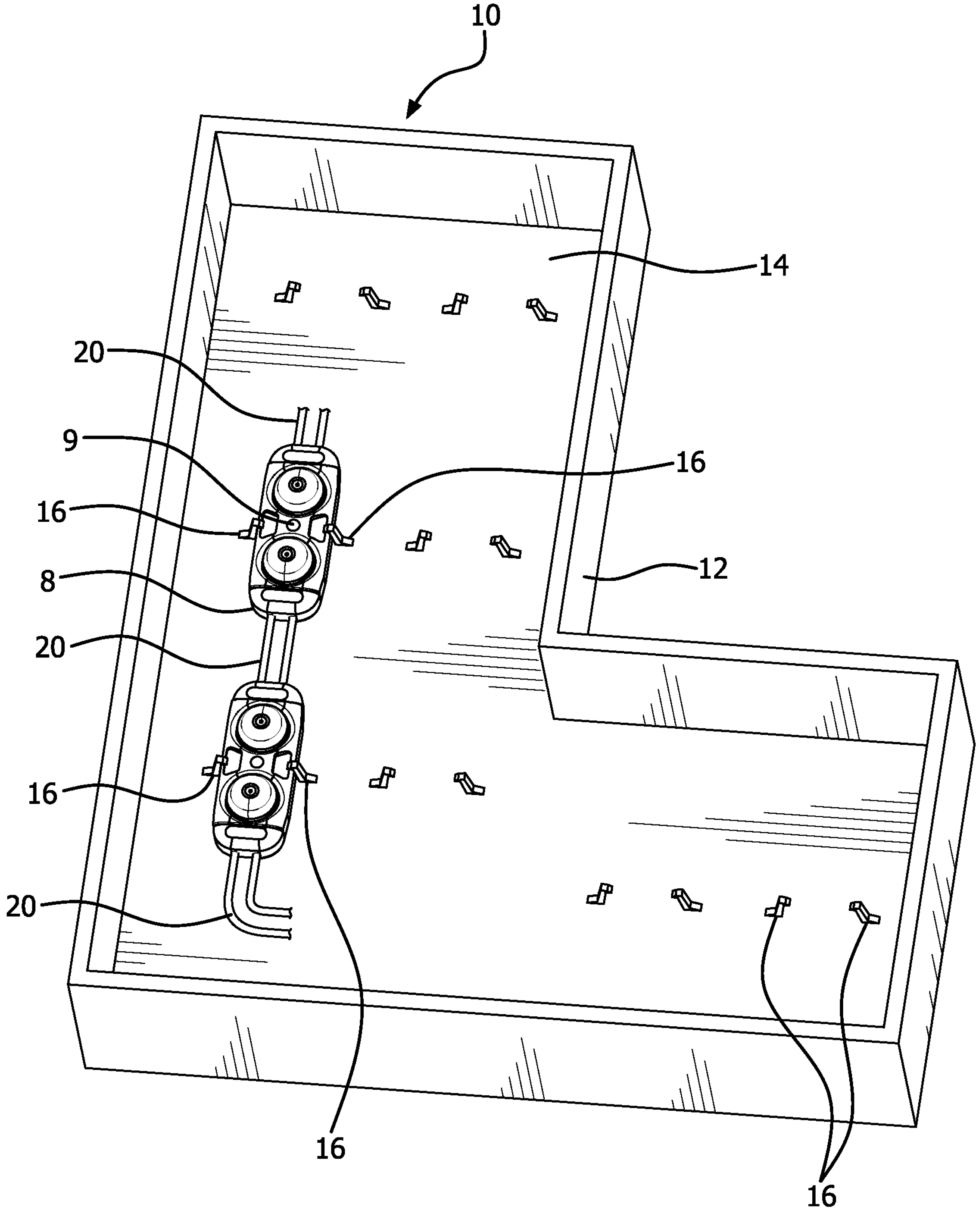
FIG. 3 is a perspective view of another embodiment of the present invention with support members, i.e. support clips, extending upward from the backboard of and within a channel letter, with an exemplar LED lights, LED modules, mounted on and attached to the back board of the channel letter.

FIG. 3 shows another embodiment of the present invention. In this embodiment, support members in the form of support clips 16 extend up from backboard 14 of channel letter 10 having outer border walls 12. As with the previous embodiment, clips 16 are arranged in the exact, designated alignment on backboard 14 to properly position LED modules 8 and the other modules to be arranged within channel letter 10 when the modules are snapped within and between clips 16. As seen in FIG. 3, modules 8 are secured within clips 16, once again resulting in the LED module being maintained and attached to backboard 14 of channel letter 10. Again, electrical wiring 20 interconnects all the modules which are secured within channel member 10.

Although the herein disclosure describes the support of LED modules, the invention should not be considered restricted to these types of LED lighting. It is contemplated that the present invention can be used in conjunction with any lighting source, e.g. faux neon.

It is thus evident that, by the present invention, LED lighting can easily and accurately be positioned and then secured within channel letters to be illuminated.

Since channel letters can be fabricated by the use of 3D printers, support members such as support pegs 6 and support clips 16, as well as other, differently shaped support members, can readily be formed contemporaneously with the fabrication of the channel letters. As such, the invention is not to be considered restricted to that which is specifically described. It is contemplated that other shapes and configurations of LED lighting support members can be utilized within the scope of the invention.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A channel letter for illuminating signage which utilizes a plurality of LED lights located within the channel letter in a designated alignment to properly align and position the LED lights within the channel letter, said channel letter, comprising:

a signage cabinet having outer border walls surrounding and defining the shape of the channel letter;

a backboard enclosing the rear of the channel letter formed in the shape of the channel letter; and a plurality of LED light support members extending up from and interspersed across the surface of the backboard, each of the plurality of light support members being located a distance from and in spaced relation to the outer border walls, and each said light support member comprising a support peg which extends through one of the plurality of LED lights for affixing, mounting and supporting each of the LED lights on the backboard, said LED light support members being located on the backboard in an arrangement which maintains and supports the plurality LED lights in said designated alignment to properly align and position the LED lights within the channel letter.

2. The channel letter as in claim 1 wherein the LED lights are LED modules.

3. A channel letter for illuminating signage which utilizes a plurality of LED lights located within the channel letter in a designated alignment to properly align and position the LED lights within the channel letter, said channel letter, comprising:

a signage cabinet having outer border walls surrounding and defining the shape of the channel letter;

a backboard enclosing the rear of the channel letter formed in the shape of the channel letter; and a plurality of LED light support members extending up from and interspersed across the surface of the backboard, each of the plurality of light support members being located a distance from and in spaced relation to the outer border walls, and each said light support member comprising support clips which overlay one of the plurality of LED lights for affixing, mounting and supporting each of the LED lights on the backboard, said LED light support members being located on the backboard in an arrangement which maintains and supports the plurality LED lights in said designated alignment to properly align and position the LED lights within the channel letter.

4. The channel letter as in claim 3 wherein the LED lights are LED modules.

5. A channel letter for illuminating signage which utilizes a plurality of LED lights located within the channel letter in a designated alignment to properly align and position the LED lights within the channel letter, said channel letter, comprising:

a signage cabinet having outer border walls surrounding and defining the shape of the channel letter;

a backboard enclosing the rear of the channel letter formed in the shape of the channel letter; and a plurality of LED light support members extending up from and interspersed across the surface of the backboard, each of the plurality of light support members being located a distance from and in spaced relation to the outer border walls, and each said light support member being conterminous with and affixed to one of the plurality of LED lights for mounting and supporting each of the LED lights on the backboard, said LED light support members being located on the backboard in an arrangement which maintains and supports the plurality LED lights in said designated alignment to properly align and position the LED lights within the channel letter.

6. The channel letter as in claim 5 wherein the LED lights are LED modules.

* * * * *